Patented Oct. 12, 1937

2,095,300

UNITED STATES PATENT OFFICE 2,095,300

PROCESS OF INCREASING ACTIVITY OF PROTEOLYTIC ENZYMES

Leo Wallerstein, New York, N. Y., assignor to Wallerstein Company, Inc., New York, N. Y., a corporation of New York No Drawing. Original application January 7, 1928, Serial No. 245,263. Divided and this application March 25, 1932, Serial No. 601,305

14 Claims. (Cl. 195—29)

This invention relates to certain improvements in activating proteolytic enzymes of that class which are active in an acid, in a slightly alkaline, and a neutral medium, and is a division of my copending application Serial No. 245,263, filed January 7, 1928, now Patent No. 1,855,431.

It is the object of the present invention to provide a process for activating enzymes of the class referred to which will involve the use of an activator which is substantially non-poisonous, and therefore easy and safe to handle, and which will have the desired activating effect on the enzyme so that its action is more complete and quicker, so that in addition to the time element a smaller amount of the enzyme is required than would be necessary without the use of the activator.

I have discovered that salts of hydro-sulfurous acid, such for instance as sodium hydro-sulfite or its formaldehyde compound, sodium sulfoxylate, are activators which, when used under suitable conditions as to temperature, etc. with the enzyme, have the desired activating effect thereon, but at the same time are substantially non-poisonous, so that they may be used with safety and with the desired effect.

As a concrete illustration of the method of utilizing my discovery, I will describe a process in which papain is selected as an enzyme of that class which is active in an acid, in a slightly alkaline, and in a neutral medium, and in a process for degumming silk.

In carrying out such process, I add to the enzyme an activator in the form of a salt or a mixture of salts of hydro-sulfurous acid which is substantially non-poisonous, the use of such salt rendering the bath safe to handle and effecting the desired acceleration of its action.

Various salts of hydro-sulfurous acid may be used and the conditions of use may be somewhat varied, but using a papain solution, such solution is prepared in the proportion of one gram of papain of commercial strength to five liters of water. To this bath is added a salt of hydro-sulfurous acid, such as sodium hydro-sulfite, or a mixture of this salt and another salt of said acid, as sodium sulfoxylate, if desired. The activator may be added to the solution in amounts which may vary. Up to 4 parts of the activator may be used for each part of papain, as for instance in the example given 1 part of the activator may be added.

The whole specified amount of the activator may be added at different times during the utilization of the enzyme, such procedure having been found to be of advantage under certain conditions of use.

By the use of such activators, the time of enzymatic action is reduced, thus permitting faster working, and the amount of the enzyme necessary is also reduced and the activators may be easily and safely handled.

What is claimed is:

1. The process of increasing the activity of proteolytic enzymes of that type which are active in a neutral, weak alkaline, and a slightly acid medium, which consists in the addition to the enzyme of a water-soluble salt of hydro-sulfurous acid.

2. The process of increasing the activity of papain, which consists in the addition to papain of a water-soluble salt of hydro-sulfurous acid.

3. The process of increasing the activity of proteolytic enzymes of that type which are active in a neutral, weak alkaline, and a slightly acid medium, which consists in the addition to the enzyme of a mixture of water-soluble salts of hydro-sulfurous acid.

4. The process of increasing the activity of papain, which consists in the addition to papain of a mixture of water-soluble salts of hydro-sulfurous acid.

5. As new article of manufacture an activated protease mixture comprising papain and a hydro-sulphite belonging to the group consisting of alkali metal salts of hydro-sulfurous acid.

6. As new article of manufacture a vegetable protease activated by a hydro-sulfite belonging to the group consisting of the alkali metal salts of hydro-sulfurous acid.

7. As new article of manufacture a vegetable protease activated by sodium hydro-sulfite.

8. As new article of manufacture an activated protease mixture comprising papain and sodium hydro-sulfite.

9. The process of increasing the activity of proteolytic enzymes of that type which are active in a neutral, weak alkaline and a slightly acid medium, which comprises adding to the enzyme a sodium salt of hydro-sulfurous acid.

10. The process of increasing the activity of proteolytic enzymes of that type which are active in a neutral, weak alkaline and a slightly acid medium, which comprises adding to the enzyme, at different times during the utilization of the enzyme material, a water-soluble salt of hydro-sulfurous acid.

11. The process of increasing the activity of proteolytic enzymes of that type which are active in a neutral, weak alkaline and a slightly acid medium, which comprises adding to the enzyme a water-soluble salt selected from the group consisting of alkali metal hydro-sulfites and alkali metal sulfoxylates.

12. As new article of manufacture a vegetable protease activated by a salt selected from the group consisting of alkali metal hydro-sulfites and alkali metal sulfoxylates.

13. As new article of manufacture a protease mixture comprising papain and a salt selected from the group consisting of alkali metal hydro-sulfites and alkali metal sulfoxylates.

14. As a new article of manufacture an activated protease mixture comprising a proteolytic enzyme of that type which are active in neutral, weak alkaline and slightly acid media and a hydro-sulphite of the group consisting of alkali metal salts of hydro-sulfurous acid.

LEO WALLERSTEIN.